United States Patent [19]

Crabtree et al.

[11] Patent Number: 4,846,619

[45] Date of Patent: Jul. 11, 1989

[54] ROBOTIC MATERIALS HANDLING SYSTEM

[75] Inventors: Timothy L. Crabtree, Anaheim; Robert G. Fairchild, Santa Ana; Charles Lindquist, La Habra, all of Calif.

[73] Assignee: Odetics, Inc., Anaheim, Calif.

[21] Appl. No.: 177,869

[22] Filed: Apr. 4, 1988

Related U.S. Application Data

[63] Continuation of Ser. No. 935,121, Nov. 26, 1986, abandoned, which is a continuation of Ser. No. 720,577, Apr. 8, 1985, abandoned.

[51] Int. Cl.$^4$ .................. G11B 15/68; B65G 1/137
[52] U.S. Cl. ...................................... 414/273; 221/87; 414/280; 901/17
[58] Field of Search ............... 414/273, 274, 276, 277, 414/280, 283, 618, 659, 661, 662, 672, 673, 785, 222, 225, 226; 221/87, 88; 294/103.1, 99.1, 104; 187/95; 901/17; 235/381

[56] References Cited

U.S. PATENT DOCUMENTS

| | | | |
|---|---|---|---|
| 2,212,711 | 8/1940 | Mac Isaac | 414/673 X |
| 3,061,111 | 10/1962 | Riemenschneider | 414/277 X |
| 3,302,804 | 2/1967 | Harris | 414/283 |
| 3,517,774 | 6/1970 | Meyer | 187/95 |
| 3,517,775 | 6/1970 | Meyer | 187/95 |
| 3,750,804 | 8/1973 | Lemelson | 414/283 X |
| 3,831,197 | 8/1974 | Beach et al. | 414/274 X |
| 3,938,190 | 2/1976 | Semmlow et al. | 360/92 |
| 3,951,271 | 4/1976 | Mette | 901/17 X |
| 3,964,577 | 6/1976 | Bengtsson | 414/280 X |
| 4,271,440 | 6/1981 | Jenkins et al. | 360/92 |
| 4,275,425 | 6/1981 | Watanabe et al. | 360/92 |
| 4,300,040 | 11/1981 | Gould et al. | 235/381 |
| 4,366,423 | 12/1982 | Inaba et al. | 901/17 X |
| 4,383,789 | 5/1983 | Takamatsu | 414/274 X |
| 4,415,975 | 11/1983 | Burt | 414/273 X |
| 4,458,802 | 7/1984 | Maciver et al. | 235/381 X |
| 4,519,522 | 5/1985 | McElwee | 414/273 X |
| 4,527,934 | 7/1985 | Blaseck | 901/17 X |
| 4,651,863 | 3/1987 | Reuter et al. | 414/283 X |
| 4,654,727 | 3/1987 | Blum et al. | 360/71 |

FOREIGN PATENT DOCUMENTS

| | | | |
|---|---|---|---|
| 504400 | 7/1954 | Canada | 294/104 |
| 2519870 | 11/1975 | Fed. Rep. of Germany . | |
| 0075674 | 7/1978 | Japan | 414/273 |
| 54-137305 | 1/1979 | Japan . | |
| 54-66806 | 5/1979 | Japan . | |
| 157156 | 12/1980 | Japan . | |
| 0012204 | 2/1981 | Japan | 414/276 |

Primary Examiner—David A. Bucci
Attorney, Agent, or Firm—Spensley Horn Jubas & Lubitz

[57] ABSTRACT

A robotic materials handling system for storing and handling box-like articles such as videocassettes includes a storage area containing a plurality of columns of storage bins, a vertical support shaft located adjacent the storage area and a manipulator assembly carried on the shaft. The manipulator assembly includes a plurality of gripper mechanisms which may be positioned adjacent desired storage bins. The system includes computer control circuitry for controlling the operation of the manipulator assembly and gripper mechanism to transport articles between desired locations.

26 Claims, 9 Drawing Sheets

ROBOTIC MATERIALS HANDLING SYSTEM

This is a continuation of copending application Ser. No. 935,121 filed on Nov. 26, 1986, now abandoned which is in turn a continuation of application Ser. No. 720,577 filed on Apr. 8, 1985, now abandoned.

BACKGROUND OF THE INVENTION

1. Field of the Invention

The present invention relates to a robotic materials handling system for storing and handling box-like articles. More particularly, the present invention relates to a robotic system for rapidly and reliably handling videocassettes in an automated cassette sequencing system. In such a system, plural tape transports are provided and the handling system automatically loads videocassettes into the transports for sequential playing of programs contained in the cassettes. Such systems are in common use in television broadcasting in which a number of programs, or "spots", are played during a typical commercial interruption.

2. Description of the Prior Art

In most prior art sequencing systems, cartridges containing videotape are held on a carousel which is moved to position the desired cartridge at a tape transport unit for loading. Such systems are relatively complex and expensive to maintain.

A recently developed system incorporates a stationary column of storage bins for holding cassettes and automatic elevator system that loads designated cassettes into specific transports at the time required. The capacity of the system is limited to forty videocassettes. Although this system provides several advantages over earlier systems, it is limited in its ability to adequately store and handle a large number of videocassettes.

SUMMARY OF THE INVENTION

The present invention is directed to a robotics materials handling system for storing and handling box-like articles such as videocassettes in applications where speed and reliability are critical. The invention provides a storage area containing a plurality of columns of storage bins, and an article manipulator coupled to a shaft located adjacent the storage area. The manipulator assembly includes one or more arm assemblies having a gripper mechanism which is movable radially with respect to the support shaft. The manipulator assembly is also vertically movable along the shaft and movable either rotatably or translationally so that the gripper mechanism can be positioned adjacent each storage bin. In the preferred embodiment of the invention, the storage area includes a plurality of columns of storage bins located about a circle, and a manipulator assembly is rotatable about the support shaft to position the gripper mechanism in line with the desired column. Preferably, a number of gripper mechanisms are included so as to provide increased speed of operation and increased reliability. The manipulator assembly is preferably microprocessor controlled, which provides optimum operation of the mechanical components of the system.

BRIEF DESCRIPTION OF THE DRAWINGS

The invention will be described with reference to the accompanying drawings, wherein.

DESCRIPTION OF THE PREFERRED EMBODIMENT

The following description is of the best presently contemplated mode of carrying out the invention. This description is made for the purpose of illustrating the general principles of the invention, and is not to be taken in a limiting sense. In particular, although the invention is described with reference to a videocassette handling system, the invention may be utilized in other applications where box-like articles are to be stored and handled. The scope of the invention is best determined by reference to the appended claims.

Figure 1:
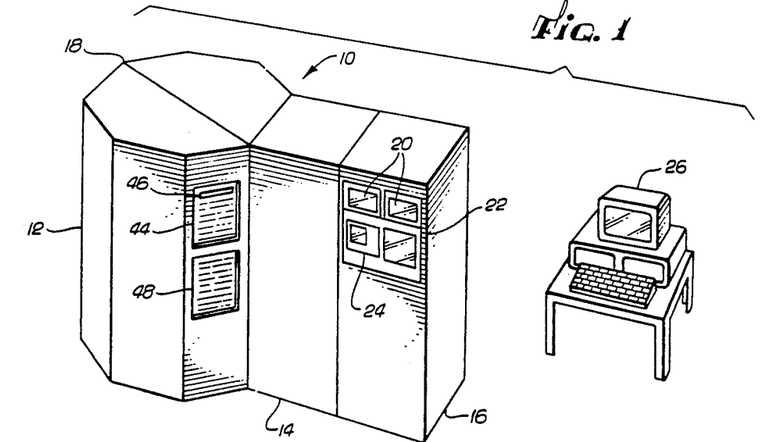
FIG. 1 is a perspective view of a cartridge handling and sequencing system incorporating the handling system of the present invention.

Referring to FIG. 1, a videocassette sequencing system is comprised of a main housing 20 including an octagonal library portion 12, a videotape transport and electronics section 14 and a monitoring section 16. The library section is hinged at 18 so as to allow access to its interior for servicing. The library section is configured to store approximately three hundred videocassettes. The electronics section 14 includes a plurality of videocassette transports and associated electronics. The monitoring section 16 includes a pair of stereo speakers 20 for audio monitoring, a video monitor 22 and a waveform monitor/vector scope 24. The operation of the system is controlled by means of a computer 26 which in the present embodiment is a personal computer including a control keyboard and a monitor.

Figure 2:
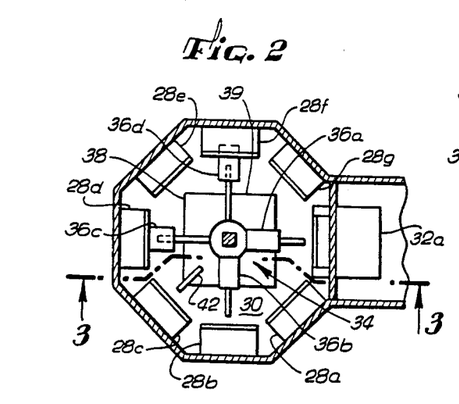
FIG. 2 is a top plan diagrammatic view of the handling system of the present invention.
Figure 3:
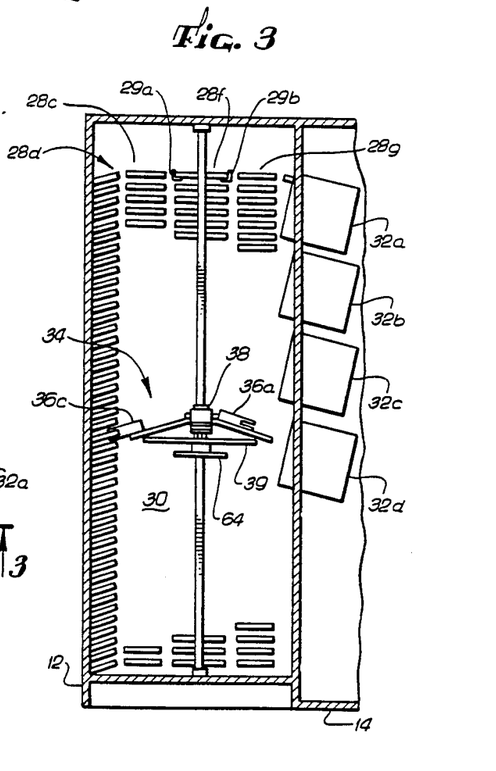
FIG. 3 is a sectional view along lines 3—3 of FIG. 2 showing the arrangement of the storage library of the present invention.

Referring to FIGS. 2 and 3, the configuration of the library section 12 will be described. The library includes seven columns 28a–g of cassette storage bins, with each bin being slightly inclined so as to aid in the retention of videocassettes. Each bin is formed of side L-shaped sections 29a and 29b as illustrated in FIG. 3, thus leaving the top and bottom of a videocassette stored in a bin exposed. In the present embodiment of the invention, each column includes forty-three individual storage bins, with the library 12 thus containing a total of three hundred and one storage bins. The columns 28a–g are arranged in a circular fashion, with one column being located on each of seven sides of the octagonal housing. The columns thus surround a central space 30.

A column of four videocassettes transports 32a-d is located on the eighth side of the library housing. The transports 32 are substantially the same distance from the axial center of the space 30 as are the storage bins 28. The transports 32 and associated electronics may be playback only, or may be record/playback to facilitate dubbing of videocassettes.

The manipulator assembly of the present invention is contained within the central space 30 and is identified generally at 34. The manipulator includes four cassette gripper mechanisms 36a-d carried on a hub assembly 38 and circuit board 39, both of which are rotatable and vertically movable with respect to a central vertical shaft 40 coincident with the longitudinal axis of the central space 30. The gripper mechanisms are spaced at angles which are integral multiples of the angular spacing of the columns of storage bins, so that the gripper mechanisms may operate simultaneously. A bar code reader 42 is also attached to the circuit board assembly 39.

The cassette manipulator assembly 34 transports cassettes between various storage bins and between storage bins and the cassette transport units under control of the computer 26. Cassettes to be entered into the library 12 are inserted via an access port 44 (FIG. 1) which exposes a portion of the column of storage bins 28a. Each of the exposed bins includes an associated cassette sensor for detecting when a cassette is inserted into it, with a sensor 46 for one of the bins being indicated in FIG. 1. The sensor may be a mechanical sensor, optical sensor or other type of sensor which can function to provide a detection signal when a cassette is inserted into a storage bin. Since the bins at the access opening are exposed at their lower side, they are provided with springs for retaining videocassettes inserted into them.

Cassettes to be removed from the system are provided by the manipulator 34 to a second access opening 48 (FIG. 1) located below the opening 44. In normal operation, all cassettes contained in the library will be entered through the access opening 44 and subsequently removed through the access opening 48. With this configuration, the operation of the system is greatly simplified, since there is no requirement of physical access to all the storage bins of the library during normal operation.

Figure 4:
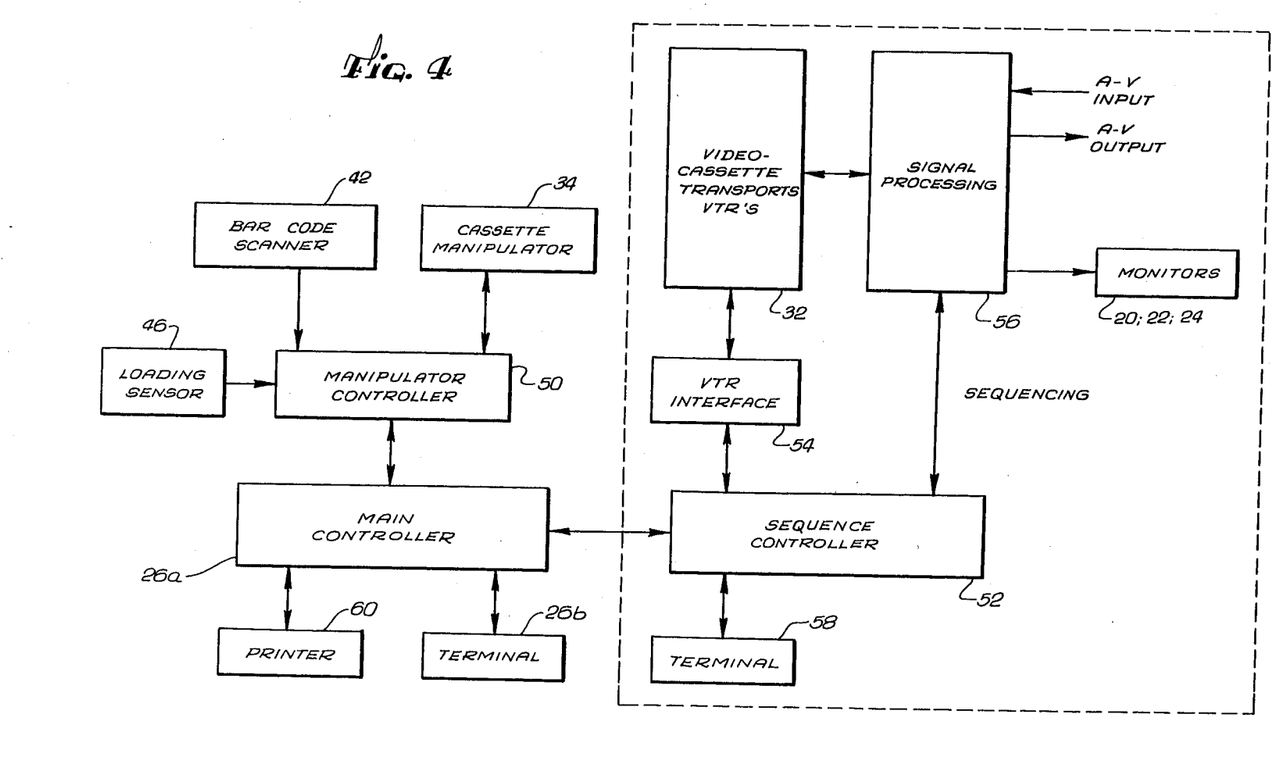
FIG. 4 is a block diagram of the videocassette sequencing and handling system which with the present invention is employed.

FIG. 4 is a block diagram of the videocassette handling and sequencing system. The system operates to access a series of cassettes from the library, load them into the transports 32 and play them consecutively in the desired order. The cassettes are then returned by the manipulator 34 to storage bins which may be in the main library for storage or adjacent the access opening 48 for cassettes that are to be removed from the library. The system is described in detail in U.S. patent application Ser. No. 06/720,591, filed concurrently with this application and now U.S. Pat. No. 4,654,727.

The computer 26 includes a main controller 26a and terminal 26b and associated printer 60. The main controller provides commands to a manipulator controller 50 and a sequence controller 52. The sequence controlelr 52 controls the operation of the transport units 32 (via interface circuitry 54) and signal processing circuitry 56. The sequencing aspect of the videocassette system does not form a part of the present invention and will not be described in detail.

The manipulator controller 50 is a microprocessor-based controller which provides commands to the manipulator 34 and decodes information from the bar code scanner 42 and sensors 46. The bar code scanner 42 is used to read a bar code contained on a label of each videocassette entered into the system. The main controller 26a is programmed to include data regarding every cassette in general used in the system, e.g., all of the cassettes in general use in a television station. As a cassette is entered into the library 12 via the access opening 44, a loading sensor 46 associated with the storage bin into which the cassette is located provides a detection signal to the manipulator controller 50. The controller 50 automatically actuates the cassette manipulator 34 to move the cassette from the loading bin to a storage bin within the library 12. Prior to the grasping of the cassette by the manipulator, the bar code on the cassette is read by means of the bar code scanner 42. The scanned code is decoded by the manipulator controller 50 and provided to the main controller 26a. The controller 26a in turn instructs the manipulator controller 50 to cause the cassette manipulator to deposit the cassette in a selected storage bin. The main controller 26a maintains a cross reference of each cassette (based upon the scanned bar code) with a storage location within the library 12.

In operation, the main controller 26a may be programmed by providing it with a time sequential list (log) of cassettes to be played. The controller 26a contains data regarding the location of every cassette in the library 12. In executing the play list, the main controller 26a will send commands both to the manipulator controller 50 and the sequence controller 52 based upon the play list and the time of day. For example, in preparation for a station break the main controller 26a will command the manipulator controller 50 to load the first four cassettes into the transport units 32 and command the sequence controller to play the cassettes in a desired order. The sequence controller 52 is then readied to accept an external cue to begin a break.

As the break progresses, the main controller 26a continuously monitors the status of the sequence controller 52. When additional cassettes are required the appropriate commands are send to the manipulator controller 50 and when additional sequences are required the appropriate commands are sent to the sequence controller 52. In this fashion, the main controller 26a maintains the current state of the machine by ensuring that the transport units 32 are loaded with the required cassettes and the sequence controller 52 is programmed with the next required sequence.

Figure 5:
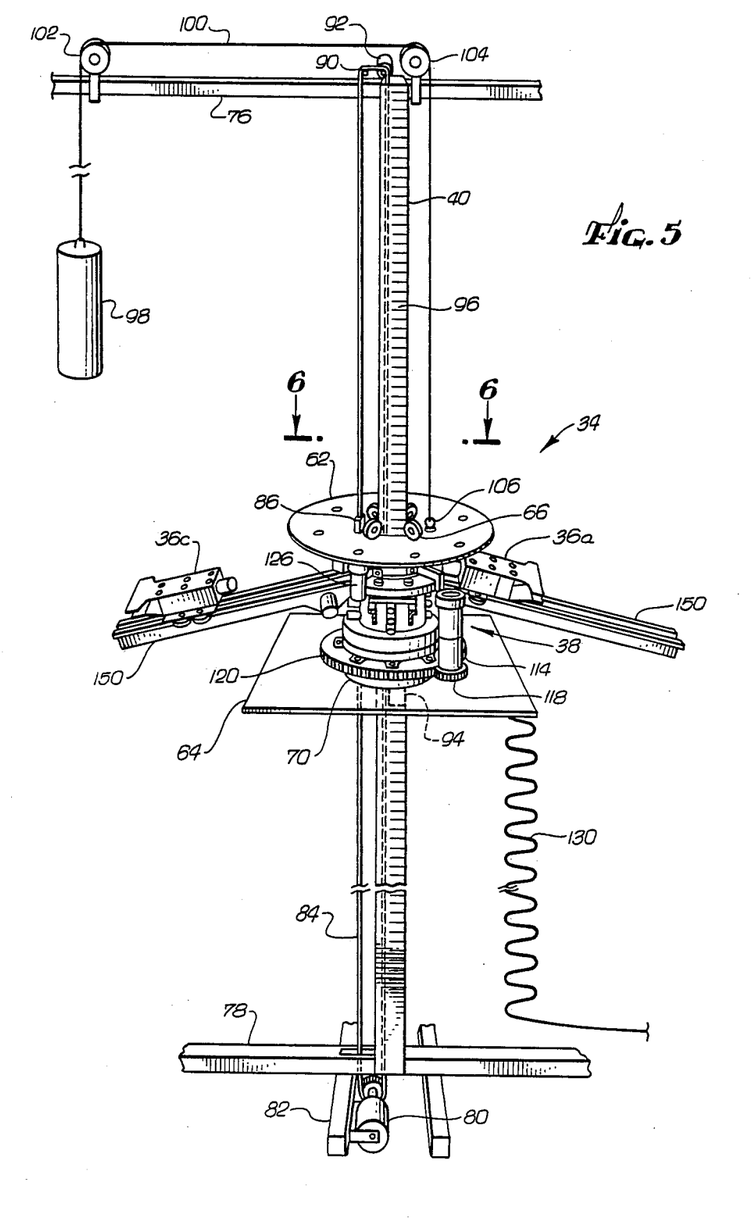
FIG. 5 is a perspective view of the manipulator assembly of the present invention.
Figure 6:
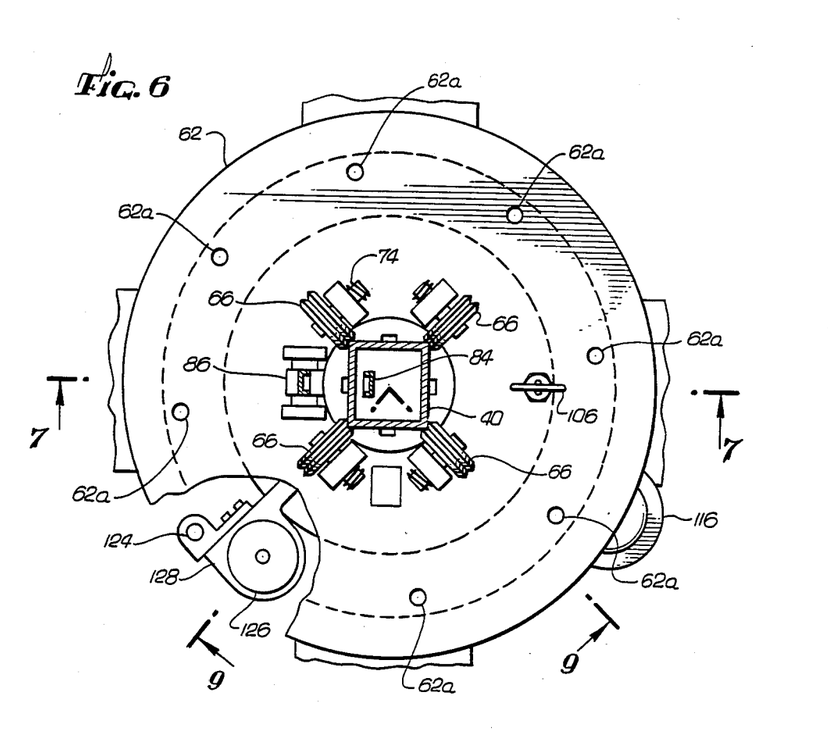
FIG. 6 is a top plan view taken along lines 6—6 of FIG. 5.
Figure 7:
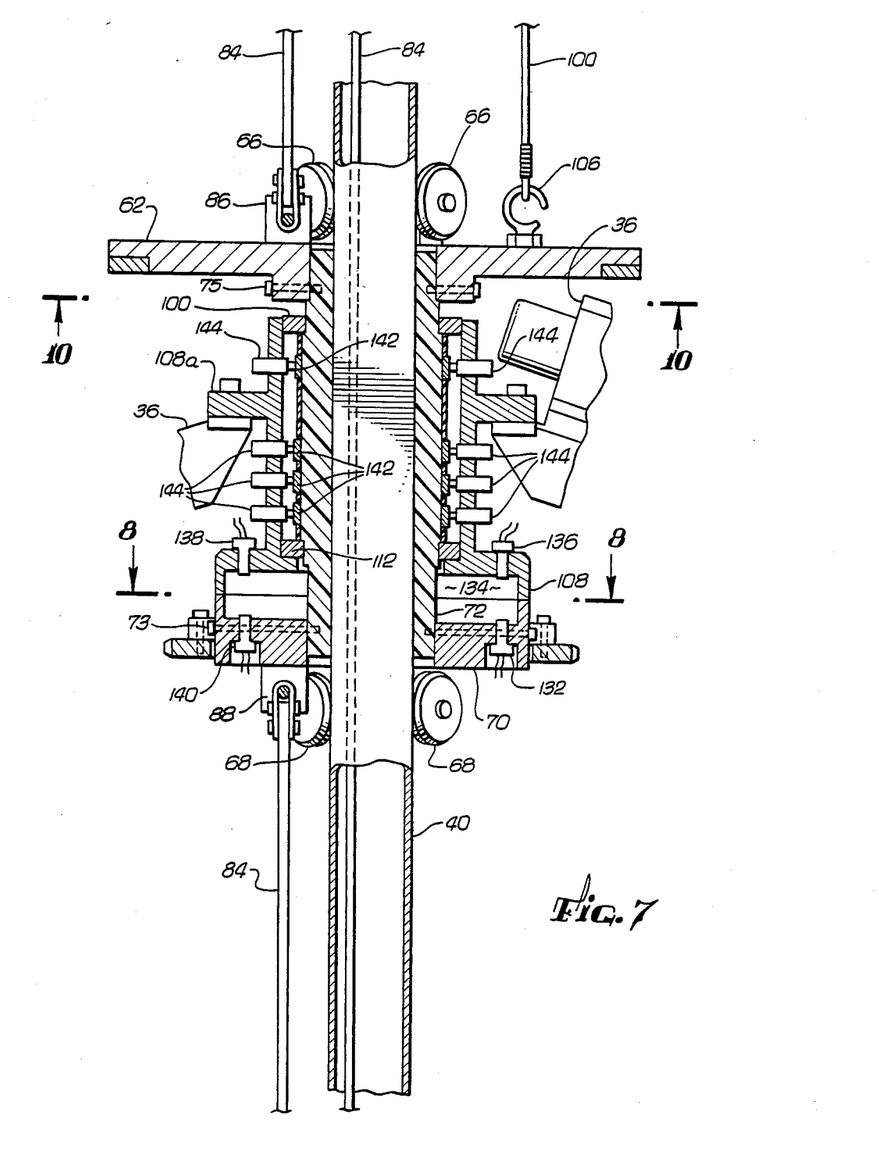
FIG. 7 is a sectional view of the manipulator assembly taken along line 7—7 of FIG. 6.
Figure 8:
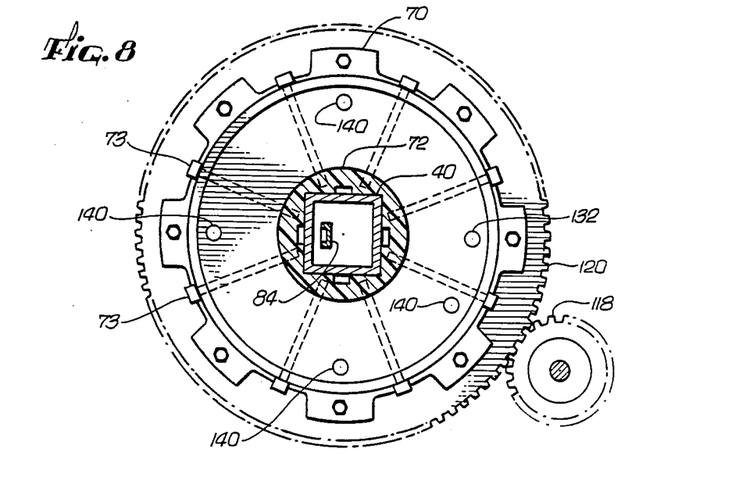
FIG. 8 is a sectional view of the manipulator assembly taken along lines 8—8 of FIG. 7.
Figure 9:
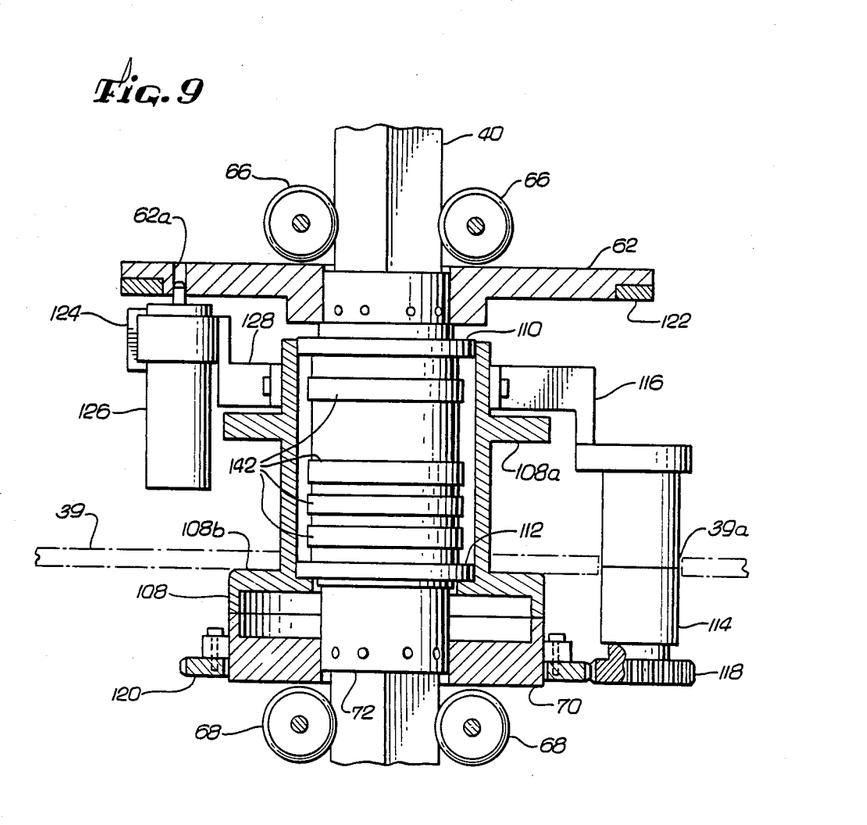
FIG. 9 is a sectional view of the manipulator assembly taken along lines 9—9 of FIG. 6.
Figure 10:
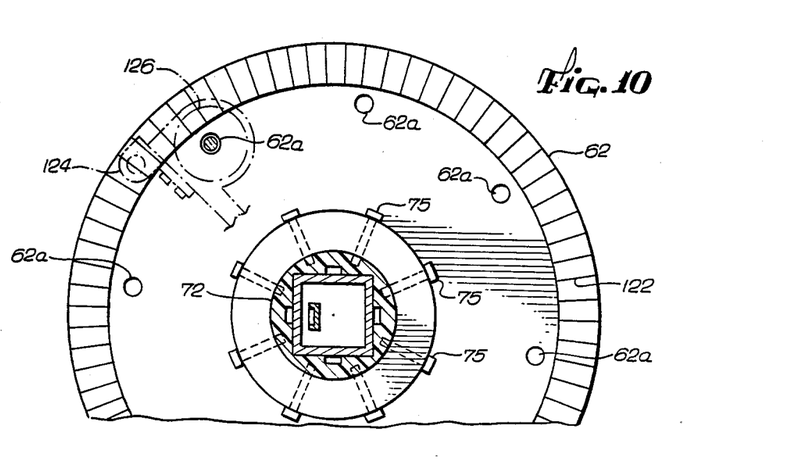
FIG. 10 is a sectional view of the manipulator assembly taken along lines 10—10 of FIG. 7.

The cassette manipulator 34 is illustrated in detail in FIGS. 5-13. For purposes of clarity, the gripper 36b, circuit board assembly 39 and bar code reader 42 have been omitted from FIG. 5. The manipulator assembly 34 includes a rotatable hub assembly 38 to which the gripper assemblies are coupled and a stationary bearing assembly including a top circular plate 62, lower circuit board 64 (also shown in FIG. 1) and a sprocket assembly 120. The bearing assembly is supported for vertical movement along the square shaft 40 by means of four V-groove rollers 66 secured to the plate 62 as illustrated in FIGS. 6, 7 and 9 and four-V-groove rollers 68 secured to a lower bearing plate 70 as shown in FIGS. 7 and 9. A central tubular slip ring collar 72 forms the remainder of the bearing portion and is interconnected to the elements 70 and 62 by means of pins 73 and 75 (FIGS. 8 and 10). The inner diameter of the collar 72 is greater than the diagonal extent of the shaft 40, and the rollers 66 and 68 are the only portion of the manipulator assembly which contact the shaft 40. It should be noted that the V-groove rollers 66 and 68 are spring-loaded as illustrated at 74 in FIG. 6 to bias them toward the shaft 40, thereby rendering the bearing assembly self-aligning.

The shaft 40 is coupled at its top and bottom to frame members 76 and 78 (FIG. 5) which form a part of the main frame of the library 12. The manipulator assembly 34 is driven along the shaft 40 by means of a stepper motor 80 attached to an additional frame section 82 just below the section 78. The stepper motor drives the manipulator assembly 34 by means of a belt 84 which is attached to the upper plate 62 at 86 and to the lower bearing element 70 at 88 (FIG. 7). The belt 84 is looped through the hollow shaft 40 so as to avoid the necessity of passing through the manipulator assembly. A pair of pulleys 90 at the top of the shaft 40 support the belt 84. In order to monitor the position of the manipulator assembly along the shaft, a precision potentiometer 92 driven by one of the pulleys 90 is provided. This potentiometer provides a coarse indication of the position of the manipulator assembly 34. In addition, an optical sensor 94 (FIG. 5) comprised of a photodiode array is secured to the bottom element 70 and provides fine position feedback by sensing position markings 96 along the shaft 40. The position feedback from the potentiometer 92 and sensor 92 are used to control the positioning of the manipulator 34 in a manner to be described.

A counterweight 98 is coupled to the manipulator assembly 34 by means of a cable 100 which is looped over pulleys 102 and 104 and attached to a ring 106 secured to the top plate 62. By including the counterweight 98, the motor 80 need only overcome the mass of the manipulator assembly and the counterweight, i.e., the force of gravity need not be overcome.

A cylindrical hub unit 108 (FIGS. 7 and 9) surrounds and is rotatable with respect to the slip ring collar 72. The hub is spaced from the collar 72 by means of upper and lower non-rotating rings 110 and 112 which are secured to the collar 72. A D.C. motor 144 is attached to the hub unit 108 by means of a bracket 116. The motor drives a gear 118 which engages a sprocket 120 secured to the lower bearing element 70. This structure is shown in FIGS. 8 and 9. When the motor 114 is driven, the gear 118 rotates to drive the motor and gear around the sprocket 120, thus resulting in rotation of the hub assembly 108. The gripper assemblies 36 are attached to the hub assembly at an extension 108a (FIG. 7) and therefore rotate with the hub assembly.

The rotational position of the hub assembly is controlled by means of optical feedback and positive detent positioning. As illustrated in FIG. 10, the top plate 62 includes radial positioning marks 122 formed around a periphery of its lower surface. These marks are sensed by an optical sensor 124, which is shown most clearly in FIG. 6. As the hub assembly rotates, the marks are counted to provide position feedback. When the desired position has been reached, final positioning is achieved by means of a solenoid 126 (FIGS. 6 and 9), the beveled plunger of which extends into one of a plurality of holes 62a formed in the top plate 62. Both the optical sensor 124 and solenoid 126 are secured to the hub element 108 by means of a bracket 128. The holes 62a are located to precisely position a gripper assembly in front of a column of storage bins or the column of transport units. The detent mechanism employed enables a rotational accuracy of better than one degree to be achieved. This positional accuracy helps to prevent any jamming of the mechanism.

As shown in FIG. 9, the main circuit board 39 (illustrated in phantom) is carried on a surface 108b of the hub unit 108. The motor 114 passes through an opening 39a in the circuit board and serves to rotationally fix the position of the circuit board. The circuit board contains a major portion of the manipulator electronics, including microprocessor circuitry. Since components on the circuit board 39 must communicate with additional portions of the system away from the manipulator assembly 34, some form of data link is required. Since the circuit board 39 rotates with the hub assembly, a cable connection cannot be employed since it would wrap around the shaft 40. The present invention employs a unique infrared communications chamber for transmitting data to the manipulator assembly 34.

Data signals from the portion of the system remote from the manipulator (e.g., the main controller 26a and a portion of the manipulator controller 50) are provided to the lower circuit board 64 by means of a cable 130 (FIG. 5) which is coiled to accommodate the vertical motion of the manipulator assembly. The electrical data signals are converted to infrared signals by an infrared transmitter 132 (FIG. 7) and transmitted into a chamber 134 defined by channels in the facing portions of the bottom bearing element 70 and the hub element 108. These elements are formed of machined aluminum and the surface of the chamber 134 is thus relatively reflective. Signals transmitted by the transmitter 132 will reflect within the chamber and will ultimately be received by an infrared receiver 136 located in the hub unit 108. Thus, data signals can be transferred from the stationary bearing section 70 to the rotating hub section 108. Similarly, signals can be transferred from the hub section to the bearing section by means of a transmitter 138 and receiver 140. As shown in FIG. 8, a plurality of transmitters 140 are employed to ensure that the transmitted signals are properly received. Similarly, a plurality of transmitters 136 may be provided in the hub section 108. In order to permit simultaneous bidirectional data communications, signals transmitted from the bearing section 70 to the hub section 108 may be transmitted at a first frequency and signals transmitted from the hub section 108 to the bearing section 70 may be transmitted at a second frequency. After reception by the receivers at either side, the infrared signals are converted to electrical signals and transmitted to the appropriate components.

In addition to the transmission of data signals, power signals must be provided to the manipulator assembly to power the motors and other electronic components contained on the manipulator assembly. This is accomplished by means of a slip ring structure illustrated in FIGS. 7 and 9. The power signals are also delivered to the lower circuit board by means of the coiled cord 130. These signals are then coupled to metal slip rings 142 which surround the slip ring collar 72. The slip rings are contacted by brushes 144 carried by the hub unit 108. Power signals are then transferred from the brushes 144 to appropriate components on the manipulator assembly.

Figure 11:
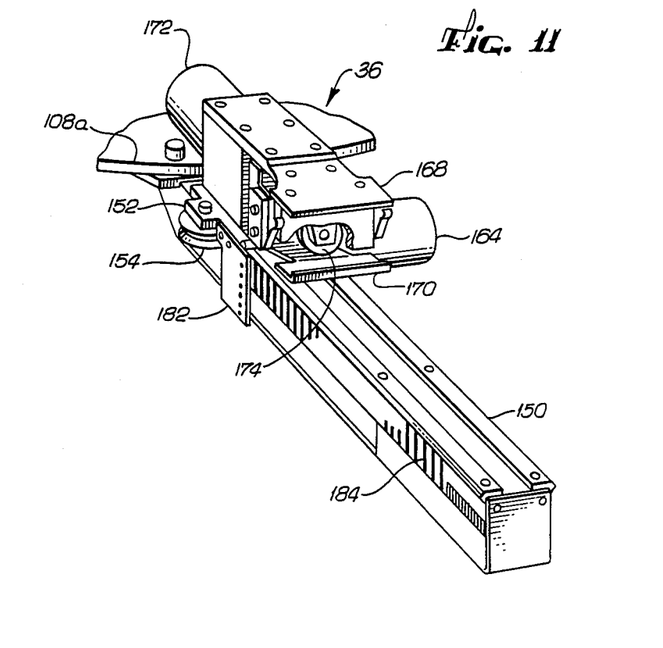
FIG. 11 is a perspective view of the slide and gripper mechanism of the present invention.
Figures 12, 13:
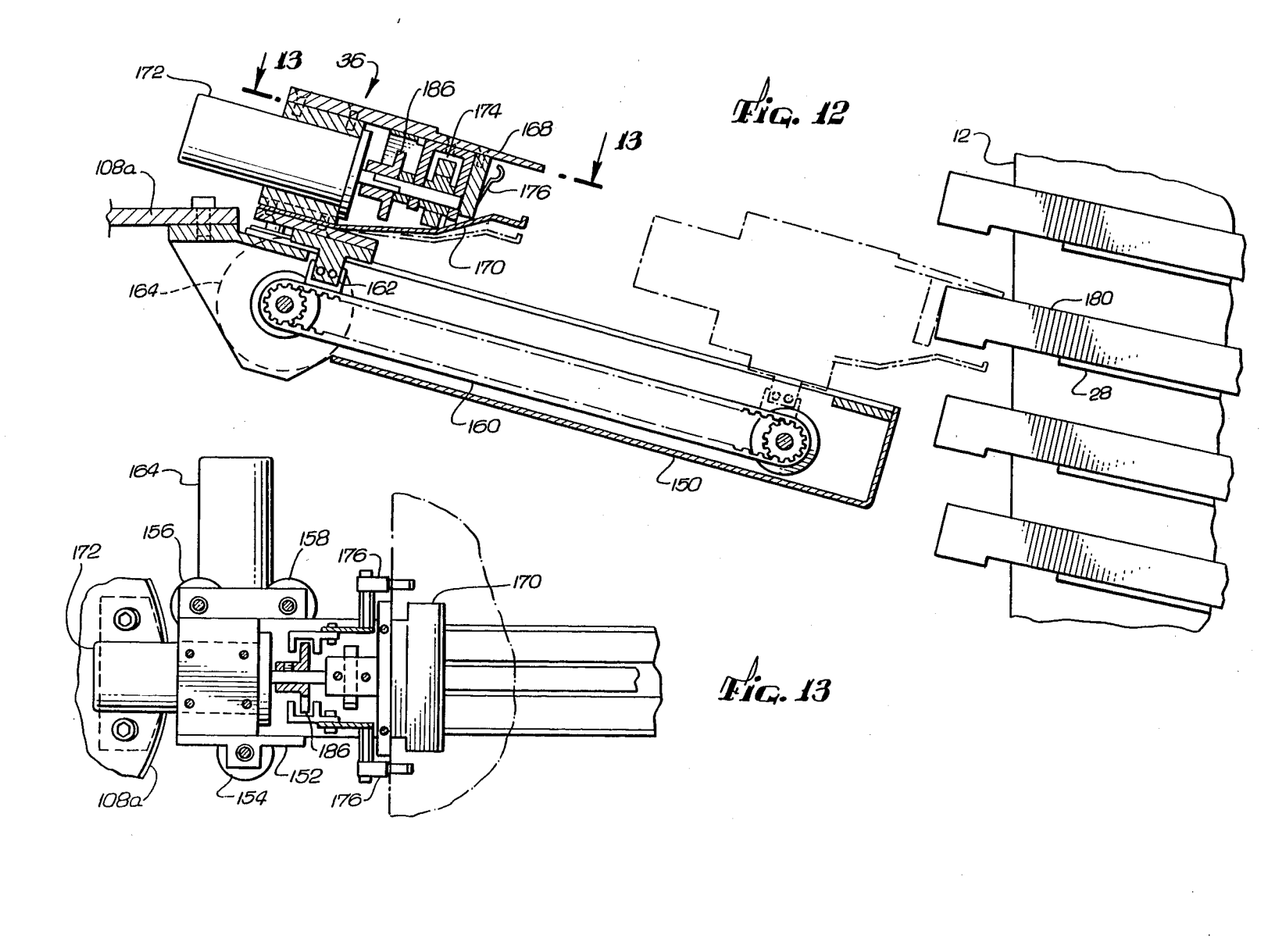
FIG. 12 is a sectional view of the slide and gripper mechanism.
FIG. 13 is a top view of the gripper mechanism taken along lines 13—13 of FIG. 12.

Details of the gripper assemblies 36 are shown in FIGS. 11–13. Each gripper assembly 36 is supported on a rail assembly 150. The gripper 36 includes a bottom platform 152 to which are secured three V-groove rollers 154, 156 and 158. These rollers contact protruding edges of the rail assembly 150 and enable the gripper mechanism 36 to slide along the rail. The rollers 156 and 158 are spring-biased toward the rail assembly similar to the rollers on the main bearing assembly, so that the gripper is self-aligning with respect to the rail assembly.

The gripper is driven along the rails by means of a timing belt 160 contained within the rail assembly 150. The gripper assembly is coupled to the belt by means of a braket 162, and the belt is driven by a DC motor 164. The gripper per se is formed by a top plate 168 and a flat berilium copper spring 170. A two-position DC motor 172 drives the spring 170 from an open to a closed position by means of an eccentrically mounted circular cam 174. A pair of switches 176 are employed to detect when a cassette has been seated in the gripper assembly.

As can be seen in FIG. 12, when it is desired to grasp a cassette 180 contained in a storage bin 28, the motor 172 is activated to open the gripper and the motor 164 is then driven to move the gripper forward to the end of the rail assembly 150. Upon detection of proper seating of the cassette 180 by means of the switches 176, the motor 172 is activated to close the gripper to grasp the cassette. The motor 164 is then driven to retract the gripper 36 and remove the cassette 180 from the bin 28. The manipulator assembly may then be moved vertically and/or rotationally to transfer the cassette to the desired location. In order to monitor the position of the gripper along the slide, an optical sensor 182 is provided to read marks 184 located along the slide. In addition, an optical sensor assembly 186 may be provided to monitor the position of the motor 172.

Figure 14:
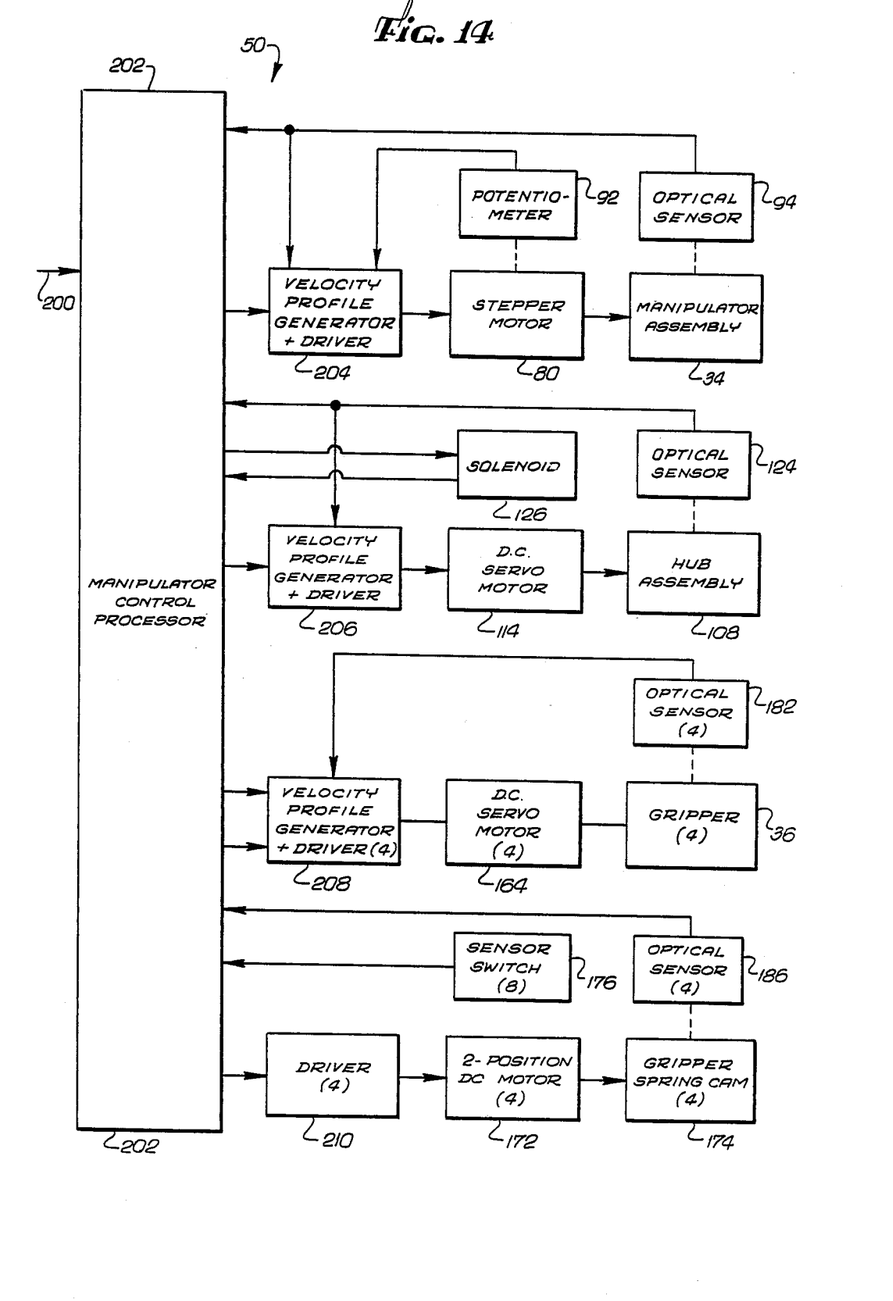
FIG. 14 is a block diagram of the control system of the manipulator assembly of the present invention.

The manner of control of the manipulator assembly will be described with reference to FIG. 14 of the drawings.

When a cassette is to be transported, the main controller 26a provides an instruction on line 200 to a manipulator control processor 202 instructing it to fetch a cassette from a particular location (e.g., storage bin or tape transport) and deliver it to a destination location. The control processor 202 has knowledge of the current position of the manipulator by means of the optical sensor 94 (for vertical position) and 124 (for rotational position). The control processor sends commands to a velocity profile generator and driver 204 to drive the stepper motor 80 to control the vertical positioning of the manipulator assembly 34. Coarse feedback is provided by the potentiometer 92 and fine feeback is provided by the sensor 94 to the velocity profile generator. The velocity profile generator is a microprocessor-based system that generates a velocity signal as a function of the position of the manipulator assembly to cause the assembly to reach the desired location in the shortest amount of time. Similarly, a velocity profile generator and driver 206 drives the DC servo motor 114 to rotate the hub assembly to the desired orientation. When the final destination is reached, the solenoid 126 will be seated in an opening 62a in the top plate 62.

The position of the manipulator assembly is moinitored by the control processor 202 to determine when its desired vertical and rotational positions have been reached, as indicated by the optical sensor 94 and solenoid 126. When this occurs, the control processor 202 instructs one or more velocity profile generators and drivers 208 to drive an associated servo motor 164 and gripper 36 forward along the slide assembly 150. Once the cassette has been contacted properly as indicated by the sensor switches 176, the control processor 202 activates a driver 210 to drive the gripper motor 172 and rotate the gripper spring cam 174. The gripper is then retracted by means of the motor 164 and the manipulator assembly is rotated and moved vertically to the destination location. The gripper is then again moved forward and the spring cam rotated so as to release the videocassette.

The velocity profile generators 204, 206 and 208 are all microprocessor-based systems which generate an optimum velocity profile for a particular distance to be traveled in order to achieve the most rapid and accurate motion. In the case of the velocity profile generators 208, different conditions will be encountered in operation depending upon whether a cassette is in the gripper and whether the cassette is to be removed or delivered from a storage bin or tape transport. In order to achieve optimum performance, both in terms of speed and reliability, a different velocity profile is generated depending on the operation to be carried out. In the present embodiment of the invention, the control processor 202 selects from among eight different velocity profiles contained in the velocity profile generators 208 to correspond to eight different operational conditions. In addition, each velocity profile generator 208 can be independently controlled, i.e., they may simultaneously generate different velocity profiles. Thus, the optimum profile may be selected for each gripper even if more than one gripper is being operated at a time.

In summary, the present invention provides a unique article storage and handling system including a storage library and a manipulator assembly. The manipulator assembly is extremely reliable and fast. The use of multiple gripper assemblies substantially increases the speed of transfer operations. In addition, it provides built-in redundancy, thereby increasing the reliability of the system. The unique control of the gripper assemblies further increases the operational capabilities of the system.

What is claimed is:

1. A robotic materials handling system for rapid storing and handling of box-like articles, comprising:
    at least one article pickup or delivery area having means for supporting an article and having an opening facing a manipulator area;
    a storage area containing a plurality of stationary columns of storage bins, arranged in a cylindrical configuration around the manipulator area, each storage bin for holding one article and having an opening facing the manipulator area;
    a stationary vertical support shaft located in the manipulator area within the storage area;
    a manipulator assembly slidably coupled to the shaft and movable along the shaft, said manipulator assembly including a plurality of arm assemblies symmetrically configured radially about the shaft, each arm assembly extending outward from the shaft and having a gripper mechanism movable toward and away from an axis of the shaft, the gripper mechanism having first and second spaced fingers for grasping opposite sides of a box-like article, wherein each gripper mechanism is operable to deposit articles to storage bins and to withdraw articles from storage bins by pushing them into and pulling them out of the opening of a bin; and
    means for positioning the arm assemblies adjacent each opening of the columns and adjacent each opening of the article pickup or delivery area location.

2. A robotic materials handling system for storing and rapid handling of box-like articles, comprising:
- at least one article pickup or delivery area having means for supporting an article and having an opening facing a manipulator area;
- a storage area containing a plurality of columns of storage bins, each storage bin for holding one article and having an opening facing the manipulator area;
- a stationary vertical support shaft located in the manipulator area adjacent the storage area;
- a manipulator assembly slidably coupled to the shaft and movable along the shaft, said manipulator assembly including at least two assemblies extending outward from the shaft and having a gripper mechanism movable toward and away from an axis of the shaft, the gripper mechanism having first and second spaced fingers which are movable toward each other to grasp opposite sides of a box-like article, wherein each gripper mechanism is operable to deposit articles to storage bins and to withdraw articles from storage bins by pushing them into and pulling them out of the opening of a bin; and
- means for positioning the arm assemblies adjacent each opening of the columns and adjacent each opening of the article pickup or delivery area location, wherein the means for positioning includes means for rotating the manipulator assembly about the shaft to position the arm assemblies at different radial positions with respect to the shaft, such that at each radial position all the arm assemblies are aligned with an article pick up or delivery area location.

3. The system of claim 2 wherein the columns of storage bins and the article pickup and delivery locations are arranged in a circular configuration about the support shaft.

4. The system of claim 3 wherein the manipulator assembly include a bearing assembly coaxial with and slidably movable along the support shaft and a hub assembly which is rotatable about the bearing assembly, wherein the bearing assembly and hub assembly travel vertically by sliding along the vertical support shaft and the arm assemblies are attached to the hub assembly to rotate therewith, and wherein the means for rotating includes a first motor for driving the hub assembly with respect to the bearing assembly.

5. The system of claim 4 wherein each arm assembly includes a rail upon which the gripper mechanism is movably mounted, a second motor for driving the gripper mechanism toward and away from the axis of the support shaft and electrically controlled actuator means for actuating the gripper mechanism.

6. The system of claim 5 including means for providing control signals for the second motor and actuator means of each arm assembly to the bearing assembly and coupling means for coupling the control signals to the hub assembly.

7. The system of claim 2 wherein the shaft has a square cross section and the manipulator assembly includes a bearing assembly including a first group of four rollers, each roller having a V-groove and contacting a different corner of the shaft, and a second group of four rollers spaced from the first group, each roller having a V-groove and contacting a different corner of the shaft.

8. The system of claim 7 including means for driving the manipulator assembly along the shaft, said means including a belt connected to the manipulator assembly and extending along a length of the shaft and a motor for driving the belt.

9. The system of claim 8 wherein the shaft is hollow and the belt is looped through the shaft.

10. The system of claim 8 including closed loop drive means for driving the motor to position the manipulator assembly at a desired vertical location on the shatf, said closed loop drive means including feedback means for detecting the position of the manipulator assembly with respect to the shaft and control means for driving the motor in response to the feedback means.

11. The system of claim 10 including first feedback means for providing a coarse indication of the position of the manipulator assembly.

12. The system of claim 11 including second feedback means for providing a fine indication of the position of the manipulator assembly, said second feedback means including position markings on the shaft and an optical sensor on the manipulator assembly for reading the position markings to provide feedback.

13. The system of claim 7 wherein the rollers include spring means for biasing the rollers toward the shaft.

14. The sytem of claim 8 further including a counterweight coupled to the manipulator assembly to move in a direction opposite that of the manipulator assembly.

15. The system of claim 2 wherein the first finger of the gripper mechanism is stationary and the second finger is a flat spring element and further including a motor driven cam for moving the spring element from an open to a closed position.

16. The system of claim 15 including a two-position motor for driving the cam.

17. The system of claim 2 wherein the manipulator assembly includes a rail extending from the shaft and the gripper mechanism includes a plurality of V-groove rollers for coupling the gripper mechanism to the rail.

18. The system of claim 2 wherein each arm assembly includes a rail along which the gripper mechanism is movable and including a motor for driving the gripper mechanism along the rail and closed loop drive means for controlling the motor, said closed loop drive means including feedback means for sensing the position of the gripper mechanism with respect to the rail and control means for driving the motor in response to the feedback means.

19. The system of claim 18 wherein the control means includes velocity profile generator means for controlling a velocity of the motor as a function of the position of the gripper mechanism.

20. The system of claim 19 wherein the velocity profile generator means includes means for selecting from among different velocity profiles as a function of the operational status of the gripper mechanism.

21. A robotic material handling system for storing and handling box-like articles, comprising:
- a storage area containing a plurality of columns of storage bins, each storage bin for holding one article;
- a vertical support shaft located adjacent the storage area;
- a manipulator assembly coupled to the support shaft including a bearing assembly movable along the support shaft; a hub assembly which is rotatable about the bearing assembly; and at least one arm assembly extending outward from the support shaft and attached to the hub assembly to rotate therewith, the arm assembly having a gripper mechanism movable toward and away from the axis of the support shaft, the gripper mechanism having a first and second spaced fingers for grasping opposite sides of an article;

means for positioning the arm assembly adjacent each storage bin including means for rotating the hub assembly with respect to the bearing assembly to position the arm assembly at different radial positions with respect to the support shaft;

means for driving the gripper mechanism toward and away from the axis of the support shaft;

actuating means for causing relative movement between the fingers of the gripper mechanism so as to grasp the article;

means for providing control signals for the gripper mechanism driving means and the gripper finger actuating means to the bearing assembly; and coupling means for coupling the control signals from the bearing assembly to the hub assembly, wherein the coupling means includes a first coupling element on the bearing assembly and a second coupling element on the hub assembly, the first and second coupling elements having facing surfaces with complementary circular channels therein to form a coupling cavity; light transmitter means on the first coupling element for converting electrical signals to light signals and transmitting them into the cavity; and light receiver means on the second coupling element for receiving light signals in the cavity and converting them into electrical signal for delivery to the gripper mechanism driving means and gripper finger actuating means.

22. The system of claim 21 including light transmitter means on the second coupling element and light receiving means on the first coupling element, thereby facilitating transmission of signals from the manipulator assembly.

23. The system of claim 21 wherein the channels of the first and second coupling elements have reflective surfaces whereby signals transmitted into the channel will reflect off of the surface of the channel until received by the light receiving means.

24. The system of claim 2 further including slip ring means of coupling power signals from the bearing assembly to the hub assembly.

25. A robotic materials handling system for storing and handling box-like articles comprising:

a storage area including a plurality of columns of storage bins and at least one loading location, said storage bins and loading location being arranged about a circular space, each storage bin and loading location having an opening facing the circular space;

a stationary vertical support shaft located at the center of the circular space;

a manipulator assembly, slidably movable along the shaft, for moving articles between storage bins and the loading location, the manipulator assembly including a plurality of radially extendable gripper assemblies positioned symmetrically about said support shaft, each gripper assembly having a pair of fingers for grasping opposite sides of box-like articles and pushing them into and pulling them out of the storage bins, the manipulator assembly further including means for rotating the gripper assemblies about the shaft to position them adjacent desired columns of storage bins; and control means for controlling the sliding movement of the manipulator assembly along the shaft; the rotation of the gripper assemblies and the grasping of the gripper assemblies.

26. The system of claim 25 including means for monitoring a rotational and vertical position of the manipulator assembly, wherein the control means causes the gripper assemblies to operate only after the manipulator has reached the desired position.

* * * * *